Aug. 31, 1937.   E. KINSELLA ET AL   2,091,321
CHANGE SPEED GEARING
Filed Aug. 8, 1935   3 Sheets-Sheet 2
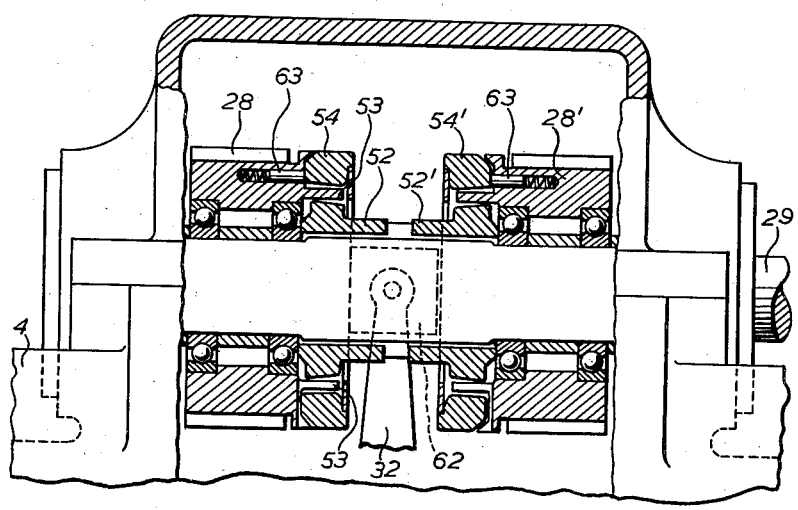
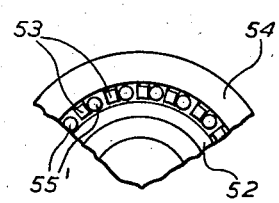
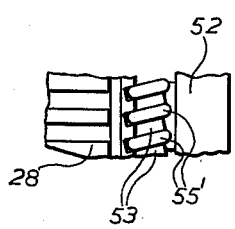
EDWARD KINSELLA
CHARLES W. ADDY
JOHN G. PRATT
INVENTORS
ATTORNEYS

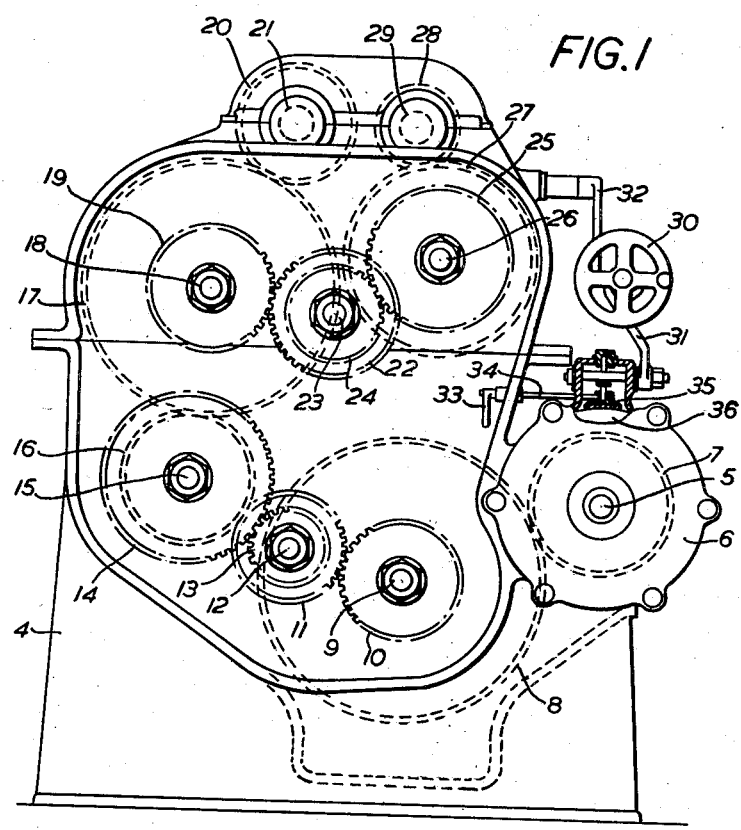

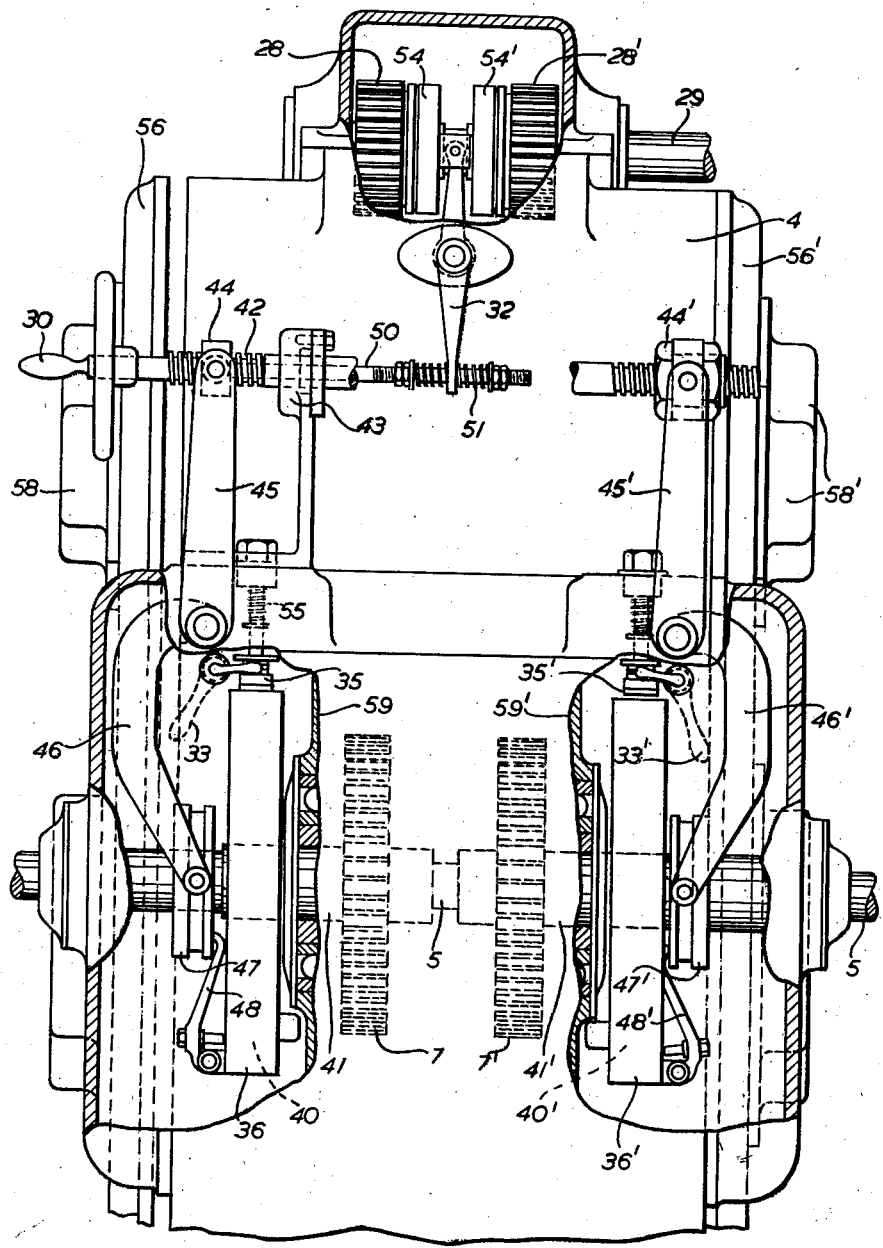

Patented Aug. 31, 1937

2,091,321

UNITED STATES PATENT OFFICE 2,091,321

CHANGE SPEED GEARING

Edward Kinsella, Charles Wesley Addy, and John Gordon Pratt, Spondon, near Derby, England, assignors to Celanese Corporation of America, a corporation of Delaware Application August 8, 1935, Serial No. 35,266
In Great Britain August 30, 1934

7 Claims. (Cl. 74—359)

This invention relates to change speed gearing, and consists in an improved form of change speed mechanism providing for changes in speed ratio without interruption of the transmission of power through the mechanism.

The mechanism according to the invention broadly comprises alternative gear trains each connected through clutch means to a driving shaft and also through free wheel mechanism to a driven shaft. The clutch means are provided with operating mechanism so arranged that while either clutch means may be completely out of action, both clutch means cannot simultaneously be out of action. The clutch means can therefore be operated to transfer the drive from one gear train to the other, one of the clutches slipping until the speed of the driven shaft has risen or fallen in accordance with the change in speed ratio effected by the transfer of the drive from the one gear train to the other. The free wheels permit the faster of the drives to the driven shaft to be operative until the gear change has been effected, and the clutches enable this change to be effected gradually.

Preferably means are provided to throw one of the free wheels out of action while the gear train to which it is connected remains inoperative, so relieving that wheel from wear. The free wheel is returned to operative position when a further gear change is to be made. With advantage the free wheel controlling means are connected to the clutch controlling means so that throwing of one or other of the free wheels into or out of action is effected automatically upon operation of the clutch means.

The gear trains may comprise replaceable toothed wheels so that while one of the trains is inoperative its gears may be replaced by other gears having a different speed ratio, the different speed ratio then being available immediately a change is desired from that given by the train remaining in operation.

The toothed wheel trains may be of the type described in U. S. application S. No. 34,564 filed August 3, 1935, a plurality of pairs of gears mounted upon fixed centers providing, by compounding of the speed ratios of each pair, for a large number of speed ratios to be transmitted through any of the wheel trains.

By way of example a gear box constructed in accordance with the invention will now be described in greater detail with reference to the accompanying drawings in which Fig. 1 is a side elevation of the gear box with one of its side cover plates removed;

Figs. 2, 4 and 5 are details of the arrangement shown in Fig. 1; and

Fig. 3 is a front elevation in part section of the gear box illustrated in Fig. 1.

The gear box comprises a casing 4 containing the gears. The driving shaft 5 is connected by means of a clutch arrangement (to be described hereafter) enclosed in the clutch casing 6 to a gear 7 shown in Figs. 1 and 3 in dotted lines. The drive is transmitted from the gear 7 through a gear 8 to a shaft 9 and thence through gears 10, 11 to a shaft 12. From the shaft 12 the drive proceeds through gears 13, 14 to a shaft 15 thence through gears 16, 17 to a shaft 18 and from the gear 17 through a gear 20 to a driven shaft 21. The drive is also transmitted from the shaft 18 by gears 19, 22 to a shaft 23 and thence by gears 24, 25 to a shaft 26 and on through gears 27, 28 to a further driven shaft 29.

The gears 10, 11, 13, 14, 19, 22, 24 and 25 are of the kind described in U. S. application S. No. 34,564 and are exchangeable to give different speed ratios between the driving shaft 5 and the driven shafts 21, 29. The gears 7, 8, 16, 17, 20, 27 and 28, shown in dotted lines, are fixed gears. As described in U. S. application S. No. 34,564, a set of gears is provided in connection with each pair of exchangeable gears. Thus, the gears 10 and 11 are drawn from one set of gears, and the gears 13 and 14 from another set, the range of gear ratios given by the first set being different from that given by the second set, so that a very large number of gear ratios between the shafts 5 and 21 is obtainable. Similarly, a large number of ratios is obtainable between the shafts 5 and 29.

All of the gears referred to, both the fixed gears and the exchangeable gears, and all of the shafts except the driving shaft 5 and the driven shafts 21, 29 are duplicated on the other side of the gear box, though the exchangeable gears on the other side are, of course, different in size to give a different speed ratio. Thus, as is shown in Fig. 3 a gear 7' is provided on the other side of the gear box corresponding to the gear 7, and a gear 28' is provided corresponding to the gear 28. The driving and driven shafts 5, 21 and 29 pass through the gear box from one side to the other but all the other shafts are duplicated, the shafts on the one side of the gear box corresponding to but being independent of the shafts on the other side of the gear box. It will be seen from Fig. 3 that the gear box 4 is divided into three compartments by means of the partitions 59, 59', the fixed gears 7, 8, 16, 17, 20, 27 and 28 and the corresponding gears such as 7' being contained in the inner compartment and between the partitions 59, 59', while the gears 10, 11, 13, 14, 19, 22, 24 and 25 are contained in the left-hand compartment on the left-hand side of the partition 59. A similar set of gears is contained, as previously described, in the right-hand compartment on the right-hand side of the partition 59'. The shafts 9, 12 and 15 provide fixed centers for the pairs of gears 10, 11 and 13, 14. That is to say the distance between the shafts 9 and 12 is fixed, and the distance between the shafts 12 and 15 is fixed, so that the sum of the pitch circles of the gears 10 and 11 is fixed, and the sum of the pitch circles of the gears 13, 14 is fixed. Similarly the shafts 18, 23, 26 provide fixed centers for the pairs of gears 19, 22 and 24, 25.

The gears on the two sides of the gear box are adapted to be used alternately. Thus, when a change of gear is required the requisite exchangeable gears 10, 11, 13, 14, 19, 22, 24 and 25 are placed in position in that half of the gear box which is not in use and then the drive is transferred from the gears in use to the gears previously not in use. This change of drive is effected by clutch means 40, 40' operated by means of a handle 30. The gears 7, 7' are carried on sleeves 41, 41', which are capable of being clutched alternatively to the driving shaft 5 by means of the said clutch means 40 or 40'. This is effected by means of a screw 42 rotatable by means of the handle 30 and carried in bearings 43, the screw running in blocks 44, 44' pivotally mounted on the ends of levers 45, 45'. The levers 45, 45' are connected by means of forked levers 46, 46' to sliding collars 47, 47' sliding on the shaft 5. The collars 47, 47' act upon levers 48, 48' the motion of which engages or disengages the clutches 40, 40' according to the direction in which the handle 30 is to be rotated. As the handle 30 is rotated the clutch 40 or 40' which is in engagement is brought out of engagement and the other clutch is brought into engagement so that the drive is transferred from the gears on the one side of the gear box to the gears (having a different gear ratio) on the other side of the gear box. The clutches 40, 40' are of the type commonly used in automobiles, that is to say are such that when the sliding collar 47 or 47' is withdrawn from the clutch, the clutch is in driving engagement, and when the collar 47 or 47' is pushed, by means of the lever 46 or 46', towards the clutch, the clutch is disengaged. In this manner it is easy to arrange that in an intermediate position of the wheel 30 both clutches are in engagement, neither of the collars 47, 47' being near enough to its clutch 40 or 40' to put said clutch out of engagement. The block 44' is made in the form of two nuts so that the position of the lever 45' with reference to the lever 45 can be adjusted. In this manner the relative positions of the collars 47, 47' can be adjusted as required.

The gears 28, 28' are connected to the driven shaft 29 by means of a free wheel arrangement whereby during the change over from one set of gears to the other the gear 28 or 28', whichever is rotating the faster, may take the drive, the shaft 29 over-running the other gear. During the normal running of the gear box it is desirable that the free wheel arrangement should be slackened in order to prevent undue wear. This is effected by means of a lever 32 connected to a rod 50 by means of springs 51, the rod 50 being connected to the block 44 on the screw 42.

The free wheel arrangements are shown in Figs. 2, 4 and 5 and are adapted to connect the loose gears 28, 28' to members 52, 52' splined to the shaft 29. This connection is made by means of rollers 55' which alternate with projections 53 on the gears 28, 28' and are so held in position between the members 52, 52' respectively and annular members 54, 54' separate from the members 52, 52', rotating with the gears 28, 28'. As is shown in Fig. 5 the rollers 55' and the projections 53 are obliquely disposed with reference to the axis of the free wheel arrangement. The members 52, 52' and 54, 54' have conoidal surfaces as is shown in Fig. 2. When the rollers 55' are being rolled (under the influence of the projections 53 as shown in Fig. 4) in one direction over the conoidal surface of the member 52 or 52' they move axially by reason of their oblique disposition and run into a narrower space between the conoidal surfaces of the members 52 and 54 or 52' and 54' whereby they are jammed. The separate outer members 54, 54' are supported alternatively to enable this jamming action to take place by a block 62 as set out below. In this manner the gear 28 or 28' is connected to the member 52 or 52' and so to the shaft 29. Thus, when one of the gears, say the gear 28, is being driven it drives the rollers 55' through the projections 53, and the rollers 55' being jammed between the members 52 and 54 in turn drive the member 52 and so the shaft 29. When the rollers are driven by the projections 53 in the other direction across the conoidal surface of the member 52 they move axially into a broader space between the member 52 and the member 54 and so run free.

The free wheels are arranged so that the one of them that is inoperative is eased to avoid wear. This is done as previously observed by means of the lever 32, which has a block 62 on its upper end engaging with the members 54, 54'. The block 62 holds one of the members 54, 54' close to its corresponding gear 28 or 28' against the action of spring plungers 63, while allowing the other to be sprung slightly away from the corresponding gear. When one of the members 54 or 54' is sprung away from its gear the space between the conoidal surface of the said member and the corresponding member 52 or 52' is at all points so wide that the rollers 55' cannot jam. By this means the rollers 55' are eased and enabled to idle more freely between the members 52, 54 or 52', 54' as the case may be and undue wear is prevented.

In order to facilitate the changing of the gears in the idle side of the gear box, brakes 35, 35', Figure 3, are provided to bring the idle shafts in the gear box to rest by acting upon brake drums 36, 36' surrounding the clutches 40, 40'. Said drums 36, 36' are fast on the sleeves 41, 41', respectively, as shown in Fig. 2. The brakes 35, 35' are applied by means of springs 55' but are normally held out of operation by means of levers 33, 33'. The levers 33, 33' are held inoperative by means of the cover plates 56, 56' of the gear box as is shown in the case of the lever 33' on the right-hand side of Fig. 3. On the left-hand side of Figure 3 the cover plate 56 is removed although it will be understood that this should not be done in practice, since in the drawings the clutch 40 is in driving engagement. When the cover place is removed to change the gears, the lever 33 or 33' is released and the brake 35 or 35' is applied to the brake drum 36 or 36'.

What we claim and desire to secure by Letters Patent is:—

1. A change speed mechanism comprising a driving shaft, two gear trains for alternate use, clutch means between each of said gear trains and said driving shaft, clutch operating means adapted to disengage the clutch means of the gear train in operation and to engage the clutch means of the gear train not in operation so as to change from one gear train to the other, and during such change to ensure the clutching of the second of said gear trains to said driving shaft before the declutching of the first from said driving shaft, a driven shaft adapted to be driven by either of said gear trains, and a free wheel gear between each of said gear trains and said driven shaft to permit said driven shaft to overrun either of said gear trains under the influence of the other.

2. A change speed mechanism comprising a driving shaft, two gear trains for alternate use, clutch means between each of said gear trains and said driving shaft, clutch operating means adapted, during changing from one gear train to the other, to ensure the clutching of the second of said gear trains to said driving shaft before the de-clutching of the first from said driving shaft, a driven shaft adapted to be driven by either of said gear trains, a free wheel gear between each of said gear trains and said driven shaft, whereby, while both gear trains are connected to said driven shaft, said driven shaft is driven by the faster of said gear trains and overruns the slower of said gear trains, and means for easing the free wheel gear of the inoperative gear train when the other gear train is clutched to the driving shaft, so as to avoid prolonged frictional wear on said free wheel gears.

3. A change speed mechanism comprising a driving shaft, two trains of toothed gears for alternate use, the gears of said trains being interchangeable with other gears to produce desired gear ratios, clutch means between each of said gear trains and said driven shaft, clutch operating means adapted to disengage the clutch means of the gear train in operation and to engage the clutch means of the gear train not in operation so as to change from one gear train to the other, and during such change to ensure the clutching of the second of said gear trains to said driving shaft before the de-clutching of the first from said driving shaft, a driven shaft adapted to be driven by either of said gear trains, and a free wheel gear between each of said gear trains and said driven shaft to permit said driven shaft to overrun either of said gear trains under the influence of the other.

4. A change speed mechanism comprising a driving shaft, two sets of shafts for alternate use, stationary bearings for said shafts, said shafts being adapted to receive intermeshing pairs of gears so as to form a gear train on said sets of shafts, clutch means between each of said gear trains and said driving shaft, clutch operating means adapted to disengage the clutch means of the gear train in operation and to engage the clutch means of the gear train not in operation so as to change from one gear train to the other, and during such change to ensure the clutching of the second of said gear trains to said driving shaft before the de-clutching of the first from said driving shaft, a driven shaft adapted to be driven by either of said gear trains, and a free wheel gear between each of said gear trains and said driven shaft to permit said driven shaft to overrun either of said gear trains under the influence of the other.

5. A change speed mechanism comprising a driving shaft, two sets of shafts for alternate use, stationary bearings for said shafts, each adapted to receive two pairs of gears, two sets of gears, each of said sets forming a number of pairs of gears adapted to be interchangeably mounted in intermeshing relationship upon said shafts, a pair from each set to act in series in either gear train, said pairs of gears forming gear ratio ranges which are different from one another so that a very large range of different total gear ratios is obtainable, clutch means between each of said two gear trains and said driving shaft, clutch operating means adapted to disengage the clutch means of the gear train in operation and to engage the clutch means of the gear train not in operation so as to change from one gear train to the other, and during such change to ensure the clutching of the second of said gear trains to said driving shaft before the de-clutching of the first from said driving shaft, a driven shaft adapted to be driven by either of said gear trains, and a free wheel gear between each of said gear trains and said driven shaft to permit said driven shaft to overrun either of said gear trains under the influence of the other.

6. A change speed mechanism comprising a driving shaft, a gear casing containing three compartments, two sets of shafts for alternate use, one set being contained partly in each outer compartment and both sets being contained partly in the inner compartment, fixed gears on said shafts within said inner compartment and a set of interchangeable pairs of gears adapted to be fitted to said shafts in said outer compartments, said fixed and interchangeable gears together constituting two gear trains, clutch means between each of said gear trains and said driving shaft, clutch operating means adapted to disengage the clutch means of the gear train in operation and to engage the clutch means of the gear train not in operation so as to change from one gear train to the other, and during such change to ensure the clutching of the second of said gear trains to said driving shaft before the de-clutching of the first from said driving shaft, a driven shaft adapted to be driven by either of said gear trains, and a free wheel gear between each of said gear trains and said driven shaft to permit said driven shaft to overrun either of said gear trains under the influence of the other.

7. A change speed mechanism comprising a driving shaft, two trains of toothed gears for alternate use, the gears of said trains being interchangeable with other gears to produce desired gear ratios, means in connection with each gear train to hold said gear train stationary while the gears are being changed, clutch means between each of said gear trains and said driven shaft, clutch operating means adapted, during changing from one gear train to the other, to ensure the clutching of the second of said gear trains to said driving shaft before the de-clutching of the first from said driving shaft, a driven shaft adapted to be driven by either of said gear trains, and a free wheel gear between each of said gear trains and said driven shaft to permit said driven shaft to overrun either of said gear trains under the influence of the other.

EDWARD KINSELLA.
CHARLES WESLEY ADDY.
JOHN GORDON PRATT.